United States Patent [19]

Kasner et al.

[11] Patent Number: 4,793,715
[45] Date of Patent: Dec. 27, 1988

[54] DETECTOR FOR ALIGNING HIGH POWER LASERS

[75] Inventors: William H. Kasner, Penn Hills; Vincent A. Toth, Harrison City; John M. Zomp, North Huntington, all of Pa.

[73] Assignee: Westinghouse Electric Corp., Pittsburgh, Pa.

[21] Appl. No.: 90,639

[22] Filed: Aug. 28, 1987

[51] Int. Cl.[4] .............................................. G01J 1/20
[52] U.S. Cl. ........................................ 374/6; 250/332; 250/349; 356/150; 374/133
[58] Field of Search ................ 374/121, 32, 132, 133, 374/6; 250/203 R, 332, 349; 356/138, 150

[56] References Cited

U.S. PATENT DOCUMENTS

| | | |
|---|---|---|
| 3,208,447 | 9/1965 | Laszlo . |
| 3,435,232 | 3/1969 | Sorensen .......................... 356/121 X |
| 3,480,777 | 11/1969 | Astheimer . |
| 3,489,008 | 1/1970 | Thornton et al. .............. 374/132 X |
| 3,572,084 | 3/1971 | May ........................................ 374/10 |
| 3,619,614 | 11/1971 | Yamaka ......................... 374/132 X |
| 3,723,013 | 3/1973 | Stirland et al. . |
| 3,819,419 | 6/1974 | Loose . |
| 4,013,465 | 3/1977 | Clapham et al. . |
| 4,082,433 | 4/1978 | Appeldorn et al. . |
| 4,107,530 | 8/1978 | Brumfield et al. ......... 250/203 R X |
| 4,121,245 | 10/1978 | Hibbard . |
| 4,126,032 | 11/1978 | Ikeda et al. ............................ 374/10 |
| 4,307,338 | 12/1981 | Frederiksen et al. . |
| 4,321,824 | 3/1982 | Martin .............................. 250/349 X |
| 4,401,104 | 8/1983 | Kuzdrall ......................... 374/132 X |
| 4,522,511 | 6/1985 | Zimmerer ............................. 374/32 |
| 4,553,852 | 11/1985 | Derderian et al. .............. 374/10 X |
| 4,593,456 | 6/1986 | Cheung ........................... 250/332 X |
| 4,596,461 | 6/1986 | DeRosa et al. . |
| 4,692,623 | 9/1987 | Roberts et al. ................... 374/32 X |

Primary Examiner—Daniel M. Yasich

[57] ABSTRACT

A detector for aligning a laser beam has been provided. The detector includes an insulative substrate, and a thermally conductive planar face attached to the substrate. The face is divided into thermally isolated sectors, each sector having the same shape and area. A corresponding thermal sensitive device is provided for each sector. Each sector is in thermal contact with a corresponding one of the thermal sensitive devices, and each thermal sensitive device produces a response proportional to the amount of laser energy impinging thereon to thereby provide indication of the misalignment of the laser beam relative to the transport path.

33 Claims, 6 Drawing Sheets

DETECTOR FOR ALIGNING HIGH POWER LASERS

BACKGROUND OF THE INVENTION

The invention relates to a detector for use in the alignment of a laser beam. In particular, the invention pertains to the use of an accurate and low cost thermal detector for aligning a high power laser beam.

In the industrial application of lasers it is sometimes necessary to transport the laser beam over significant distances, frequently many feet. Laser beam transport may be accomplished by deflecting the beam off several mirrors or other optical elements which are suitably aligned along a desired beam path. In order to perform these functions, one must properly align the laser beam with each of the optical elements. If the laser beam is visible, alignment of each optical element can be performed by observing the beam position on a target placed downstream of the optical element and adjusting the element until the visible beam is on target. In some cases, alignment of a laser beam whose radiation is not visible has been accomplished by using a visible laser beam, typically a Helium-Neon (HeNe) laser, as a tracking beam. In such cases, the HeNe laser beam is first aligned with the main laser beam using techniques that are known to those skilled in the art. Thereafter, the optical elements may be aligned using the visible tracking beam and the targeting technique described above.

In the development of a laser beam transport system for use in the laser welding of repair sleeves in defective steam generator heat exchanger tubes, it is necessary to have a detector system for monitoring the position of a high power $CO_2$ laser beam. Many different detectors have been developed that can be used to aid in the alignment of such laser beams. These detectors include photosensitive devices, thermal devices, pyroelectric devices and others. Although detectors respond to a wide range of laser wavelengths and power levels, they are not well suited for high power applications. Some devices consist of a single sensing element and thus are not adequate to allow the laser beam to be aligned with sufficient accuracy. Other detectors consist of linear or two dimensional arrays of photosensitive sensing elements, and may require complex resolution circuitry. Photosensitive detectors also tend to be fragile and they do not respond well to the high laser powers encountered in the application contemplated. Furthermore, they may not be configured in the shapes and sizes required for the application.

SUMMARY OF THE INVENTION

The present invention describes a relatively simple and low cost thermal sensitive detector that is suitable for aligning a high power $CO_2$ laser. It may also be configured as a drift detector that can be used to provide control signals to turn off the laser if the optical system becomes misaligned and the beam wanders or drifts from the desired beam path. The detector is a multi-element thermal sensitive device that monitors the temperature rise of the several elements caused by the laser radiation incident thereon.

More specifically, the detector includes an insulative substrate, and a thermally conductive planar face attached to the substrate. The face is divided into thermally isolated sectors, each sector having the same shape and area. A corresponding thermal sensitive device is provided for each sector. Each sector is in thermal contact with a corresponding one of the thermal sensitive devices, and each thermal sensitive device produces a response proportional to the amount of laser energy impinging thereon to thereby provide indication of the misalignment of the laser beam relative to the beam path.

DESCRIPTION OF THE INVENTION

Figure 1:
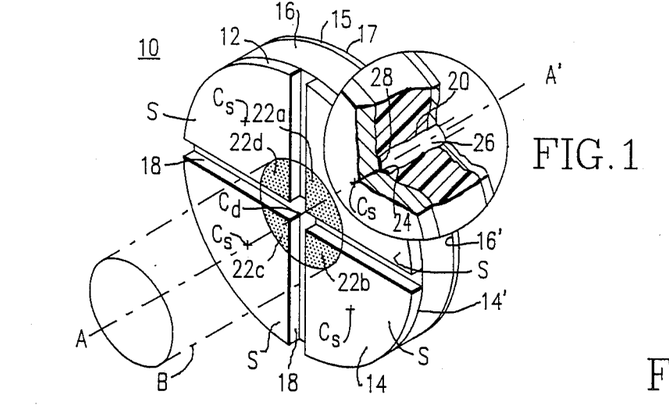
FIG. 1 is a schematic front perspective view, with a portion broken away and enlarged, of a circular disc type detector suitable for aligning a laser beam in accordance with one aspect of the present invention.

FIG. 1 shows one embodiment of a circular disc type detector 10 of the present invention which is useful for aligning a high power laser beam B (illustrated in dotted lines in the form of a right cylinder). The detector 10 is divided into four identical quadrants or sectors S. Fewer or more divisions of the detector 10 could be provided as well, and such devices are considered to be within the scope of the invention. However, for purposes of illustration and explanation, the detector 10 is divided into four quadrants or sectors S.

Figure 2:
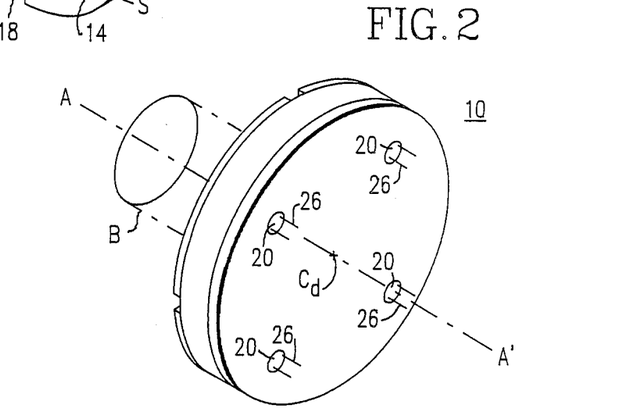
FIG. 2 is a schematic rear perspective view of the detector shown in FIG. 1.

Although the detector 10 shown in FIGS. 1 and 2 is circular or disc-like in shape, the function of the detector 10 is not necessarily dependent upon such shape. Other configurations, such as a square, a rectangle or a non-symmetrical shape, will work. Such detectors are likewise considered to be within the scope of the invention.

The detector 10 shown in FIG. 1 is comprised of a laminate of a thermally conductive layer 12 bonded to an insulative substrate 16. The conductive layer 12 has an exposed front surface 14 and a back surface 14' confronting the substrate 16. In the embodiment of FIG. 1, the thermally conductive layer 12 is a thin metal foil, having a nominal thickness of between about 0.01–0.015 inch, and the substrate 16 is a thermally and electrically insulating material. In the embodiment shown, a second thermally conductive layer or metal foil 15 having an exposed rear surface 17 may optionally be bonded to the backside 16' of the substrate 16.

Orthogonal slots 18 are formed in the conductive layer 12 and cross a geometric center $C_d$ of the detector 10 to divide the conductive layer 12 into four identical sectors S. The slots 18 are relatively narrow and are typically about 0.01 inches wide and have a depth sufficient to penetrate the substrate 16, as shown, so that the conductive layer 12 is severed and the sectors S are thermally isolated from each other. Four relatively small diameter holes 20 (only one is shown in FIG. 1) having a nominal diameter of about 0.045 inch, are formed in the detector 10 from the back surface 17 of second thermally conductive layer 15 through substrate 16. The holes 20 have flat bottoms 24 and are preferably drilled to a depth that will expose the back surface 14' of the conductive layer 12. Care must be exercised in the drilling operation to ensure that the conductive layer 12 is not damaged. The holes 20 are located, on each, in positions aligned near a geometrical center $C_s$ of each respective sector S.

In the detector 10 shown in FIGS. 1 and 2, four thermal sensitive devices 26 are used, one positioned in each of the holes 20. Thermal sensitive devices 26 are bonded to the back side 14' of the conductive layer 12 with a thermally conducting epoxy 28. Exemplary thermal sensitive devices 26 useful in the present invention are thermistors which are well known devices that have a resistance characteristic that changes in proportion to the temperature of the device. The terms thermal sensitive devices and thermistors may be used interchangeably and with the same reference numeral as appropriate.

The principle of operation of the detector of the present invention can be explained with the aid of FIGS. 1 and 2. When a laser beam B, represented by the dashed cylinder having an optical axis A—A', is incident on the front surface 14 of the detector 10, some of the laser radiation is absorbed and converted to heat, resulting in an increase in the temperature of the individual sectors S. If the laser beam B is cylindrically symmetrical and is centered at $C_d$ on the disc type detector 10, as shown, each of the sectors S should receive the same laser radiation and should experience the same temperature increase. However, if the beam B is not centered, some sectors S will receive more radiation than others and the temperature of the individual sectors S will therefore be different. The thermistors 26, which are in contact with the back side 14' of the conductive layer 12, are each individually responsive to the temperature of the corresponding sector S to which each is attached. Circuit means (discussed hereinafter in connection with FIG. 9) sensitive to the variable resistance of the thermistors 26 produces outputs which can be used to determine the position of the beam B relative to the center $C_d$ of the detector 10. For example, one can determine the direction that the laser beam B needs to be moved to center it on the disc detector 10 by comparing the outputs of the thermistors 26 and moving the beam B until the outputs are equal.

In operation, the detector 10 in FIG. 1 is positioned so that its center $C_d$ is located in the desired optical path of the laser beam B, which optical path is represented by the center line or central axis A—A' of the beam B.

If the beam B is precisely aligned relative to the detector 10, the optical axis A—A' of the Beam B passes through the center $C_d$ of the detector 10, and each sector S will receive equal amounts of laser energy. The radiation falling on the detector 10 is illustrated in FIG. 1 as a quartered circle formed of shaded areas 22a–22d. If the areas 22a–22d are equal, the beam B is properly aligned.

The energy of the beam B falling on a particular sector S is conducted by the conductive layer 12 to the particular thermal sensitive detector 26 attached thereto. The response of each thermal sensitive detector 26 is proportional to the corresponding area 22a–22d of the beam B intercepted by each of the respective sectors S, which response is directly proportional to the energy absorbed by the corresponding sectors.

Figure 3:
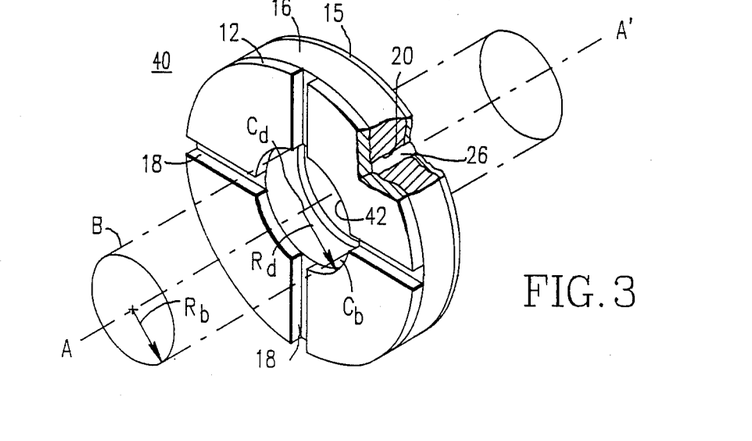
FIG. 3 is a schematic front perspective view, with a portion broken away, of a ring type detector suitable for sensing the drift of the laser beam from a prescribed path in accordance with another aspect of the invention.

FIG. 3 shows another embodiment of the invention in the form of a ring type detector 40 which may serve as a warning device to detect misalignment of a previously aligned laser beam B. The same reference numerals are used in FIG. 3 for corresponding elements illustrated in FIGS. 1 and 2. The detector 40 is the same in most essential respects to the arrangement of FIGS. 1 and 2 except that it is formed with a relatively large central aperture 42 therein. The aperture 42 has a radius $R_d$ which is slightly larger than the radius $R_b$ of the beam. The difference $R_d - R_b$ is the clearance $C_b$ of the beam B with respect to the aperture 42, or the allowable drift. When the optical axis A—A' of the beam B is aligned with the center $C_d$ of the detector 40 it passes through the aperture 42 unobstructed. When the beam B drifts in any direction by an amount greater than $C_b$ one or more sectors S will intercept the beam B and be heated, thereby causing a change in one or more of the thermal sensitive devices 26. Thus, if the beam B drifts the detector 40 will provide a detachable response whereby corrective action may be taken.

Normally, in the operation of the disc detector 10 shown in FIG. 1 it is desirable to operate the laser in a pulsed mode. Continuous laser operation may heat the detector 10 beyond the linear range of the thermal detectors 26, and may in fact heat the detector 10 to a point where it is damaged. The pulsed laser operation can be achieved either by pulsing the laser discharge, or if that is not possible, by the use of a mechanical chopper (not shown) in the path of the laser beam. Both techniques are known to those skilled in laser and optics technologies.

In the operation of the ring detector 40 shown in FIG. 3, pulsed operation is usually not required because it is intended that the ring detector 40 detect a temperature rise only after the beam has drifted. When the temperature increases beyond a given limit, the laser may simply be shut down.

The conductive layer 12 shown in the various embodiments of FIGS. 1–3 (and also in the embodiments illustrated in FIGS. 6 and 8 described hereinafter) is preferably fabricated from a metal which has a high thermal conductivity and which facilitates rapid temperature equalization of each sector S. Rapid temporal response of the detector to the laser pulses ensures that the sensitivity of each sector S is relatively independent of the distribution of laser beam energy that strikes it. In other words, the output of a thermal sensitive device should not depend on where the laser beam B strikes the sector S. Copper has such a satisfactory temporal response and is relatively inexpensive, durable and readily available in various forms as part of commercially available printed circuit (PC) board configurations.

A $CO_2$ laser emits 10.6 micron radiation. Although copper is a good conductor of the thermal energy, it is also a very good reflector for the 10.6 micron radiation produced by the $CO_2$ laser. When copper is used for the conductive layer 12 a significant portion of the laser energy impinging on front surface 14 may be lost due to reflection thereby producing a correspondingly low sensitivity. Attempts to increase the absorbtivity (reduce reflectivity) of the surface 14 by deposition of various absorbtive coatings thereon have not resulted in a satisfactory increase in the absorbtivity of the copper, because the intensity of the laser radiation tends to degrade and thus render ineffective such coatings.

Figure 4A:
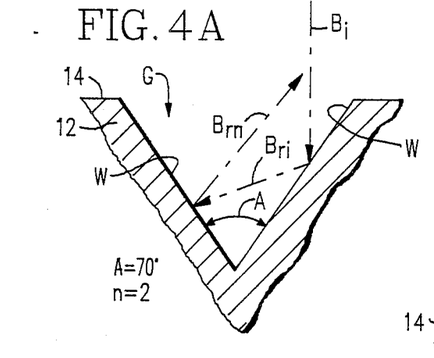
FIGS. 4A-4D are illustrations of V-shaped grooves formed in a fragmentary portion of the front surface of a detector, which grooves have walls disposed at various angles suitable for trapping laser radiation.
Figure 4B:
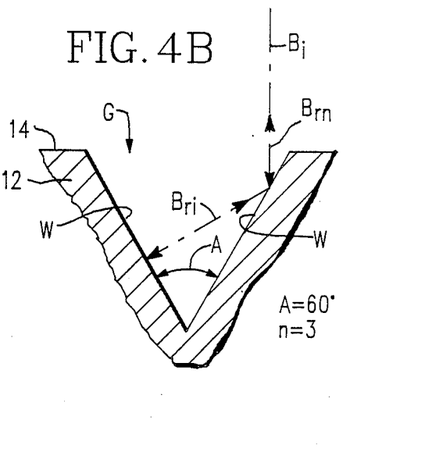
Figure 4C:
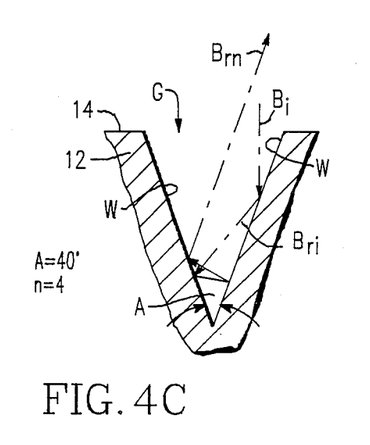
Figure 4D:
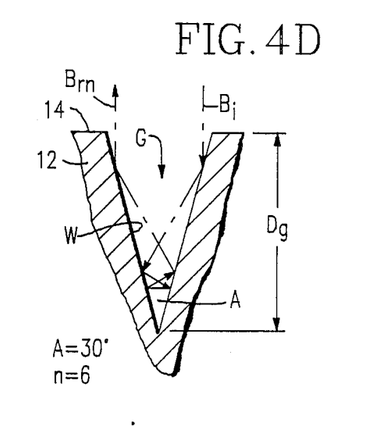
Figure 5:
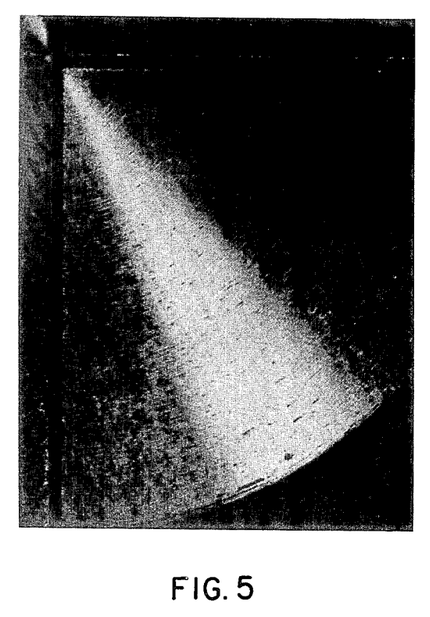
FIG. 5 is a photomicrograph showing the front surface of an exemplary detector.

In the present invention, absorbtivity of the front surface 14 has been improved by providing "V" shaped grooves G in the conductive layer 12. FIGS. 4A-4D show examples of various groove configurations. The grooves G have walls W which are inclined at different exemplary included angles A as follows: FIG. 4A, A=70°; FIG. 4B, A=60°; FIG. 4C, A=40°; and FIG. 4D, A=30°. An incident laser beam $B_i$ interacts with each groove and is reflected as beam $B_{r1} - B_{rn}$, n times from walls W. It is apparent that the number of reflections n that the incident laser beam $B_i$ experiences before it is reflected back from the surface 14 as nth reflected ray $B_{rn}$ increases as the included angle A between the walls W of the grooves G decreases. At each of these reflections, some of the laser energy is absorbed. As n increases, the absorbtivity of the surface 14 and therefore the sensitivity of the detector increases. It is therefore desirable to make the angle A of the grooves G small. In accordance with the present invention there appears to be a practical limit that can be readily machined into the front surface 14 of the conductive layer 12. In devices that have been tested, an included angle A of about 30° has been used (FIG. 4D). The width $W_g$ of such a groove G is about 0.002 inch and the depth $D_g$ is about 0.004 inch. The grooves G are machined in a spiral pattern resembling the configuration of a phonograph record on the front surface 14 of the conductive layer 12 (see FIG. 6B). Other groove patterns are possible and are within the scope of the present invention. FIG. 5 is a photomicrograph showing grooves G in the surface of an exemplary detector.

Figure 6A:
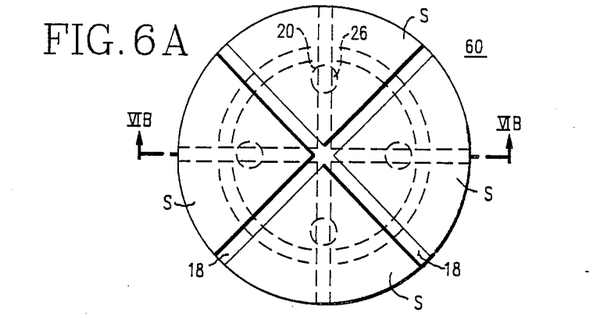
FIG. 6A is a top plan view of a detector according to another embodiment of the invention.
Figure 6B:
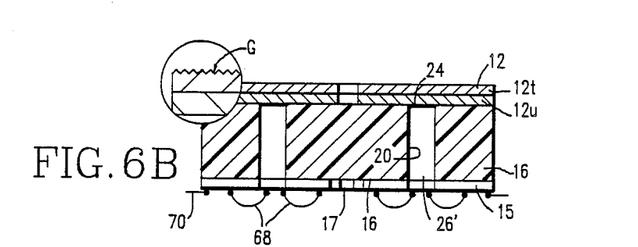
FIG. 6B is a side sectional view, with an enlarged portion of the detector illustrated in FIG. 6A, taken along line VIB—VIB thereof.
Figure 6C:
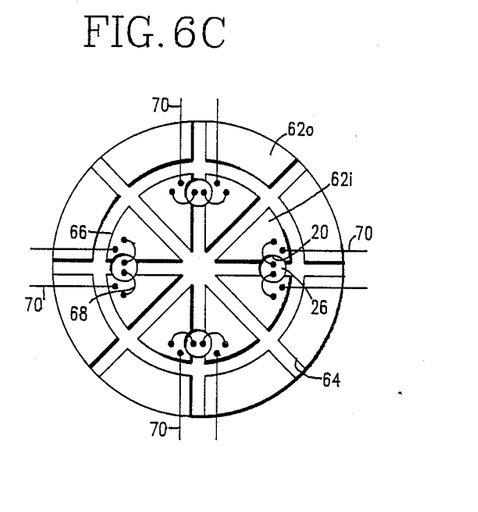
FIG. 6C is a bottom view of the detector illustrated in FIGS. 6A and 6B.

FIGS. 6A-6C illustrate another embodiment of a detector 60 of the present invention. Reference numerals for corresponding elements are the same as those in FIG. 1. The detector 60 in FIGS. 6A-6C is formed of a printed circuit (PC) board material. The detector 60 includes a substrate 16, laminated conductive layer 12 formed of a first or under layer 12u of copper adhered to the substrate 16, and a second or top layer 12t of copper soldered to the under layer 12u. The top layer 12t improves heat transfer within the conductive layer 12. A second or back layer 15 of copper is adhered to the backside 16' of substrate 16 in a known manner. The top layer 12t has 30° grooves G formed in its exposed or front surface 14 (FIG. 4D). Orthogonal slots 18 are formed in the conductive layer 12 to form four separate sectors S. The back layer 15 is divided into eight inner sectors 62i, and eight outer sectors 62o by diametric slots 64 and circular slot 66. Holes 20 drilled through back layer 15 from the back side 17 and through the substrate 16 bottom out in flat bottoms 24 against the back side 12u' of the under layer 12u as shown in FIG. 6B. A thermal sensitive device or thermistor 26, having thin output leads 68, is located in each hole 20 in thermal contact with the conductive layer 12. The thermistors 20 are connected to detector circuitry not shown in FIGS. 6A-6C (See FIG. 9). The thin leads 68 from the thermistors 26 are soldered, one each, to adjacent inner sectors 62i as shown in FIGS. 6B-6C. Output leads 70 are selectively connected to the thermistor leads 68 by soldering to the inner sectors 62i as shown in FIG. 6C. Thus, the inner sectors 62i act as strain relief contact points for attaching the thermistors 26 to outside circuitry. Other sectors 62o may be used for the same purpose of desired.

Figure 7:
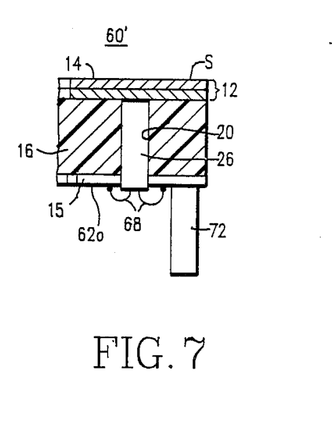
FIG. 7 is a fragmentary cross section of a modified version of the detector shown in FIGS. 6A-6C.

FIG. 7 illustrates a detector 60' identical to the detector 60 shown in FIGS. 6A-6C, except that ambient temperature compensating thermistors 72 (one shown) are provided. In detector 60' (FIG. 7), thermistor 26 monitors the temperature changes of a corresponding individual sector S of the detector 60'. Each thermistor 26 is embedded in a hole 20 drilled into the substrate material as described above. Each thermistor 26 not only detects the temperature change in the corresponding sector S caused by absorbtion of laser radiation but each thermistor is, in addition, sensitive to changes in the ambient temperature. This sensitivity to ambient temperature is undesirable because it causes an almost continuous change in the resistance level of each thermistor 26 which makes interpretation of the temperature signals induced by the impinging laser radiation difficult. To overcome this problem, the ambient temperature compensating thermistor 72 (hereinafter referred to as compensating thermistor 72) is provided for each sector S (FIG. 7). Only one compensating thermistor and one sector S is shown in FIG. 7. Compensating thermistor 72 is positioned, for example, one for each sector S, in contact with an outer sector 62o in back layer 15 of the detector 60' behind a respective corresponding sector S. Thus, each compensating thermistor 72 is separately responsive to changes in ambient temperature of each respective sector S. When coupled to suitable sensing circuitry (FIG. 9), the effect of ambient temperature changes can be ignored and stable operation of the detector 60' over extended periods of time can be achieved because ambient swings have little or no effect on the output of the detector 60'.

There may be applications wherein it may be useful or desirable to employ more than one thermal sensitive device 26 in each sector S of a detector manufactured in accordance with the teachings of the present invention. In such case, it is possible to locate a plurality of parallel connected thermal sensitive devices 26 in appropriately located apertures or holes 20 formed in the substrate 16 hereinbelow before described. The locations of such multiple thermal sensitive detectors 26 may be symmetrically located about the center $C_s$ of a sector (FIG. 1) or may be located, for example, near a marginal edge of the aperture 42 (FIG. 3). Thus, an arrangement with a plurality of thermal sensitive detectors 26 for individual sectors as is contemplated to be within the teachings of the present invention.

Figure 8:
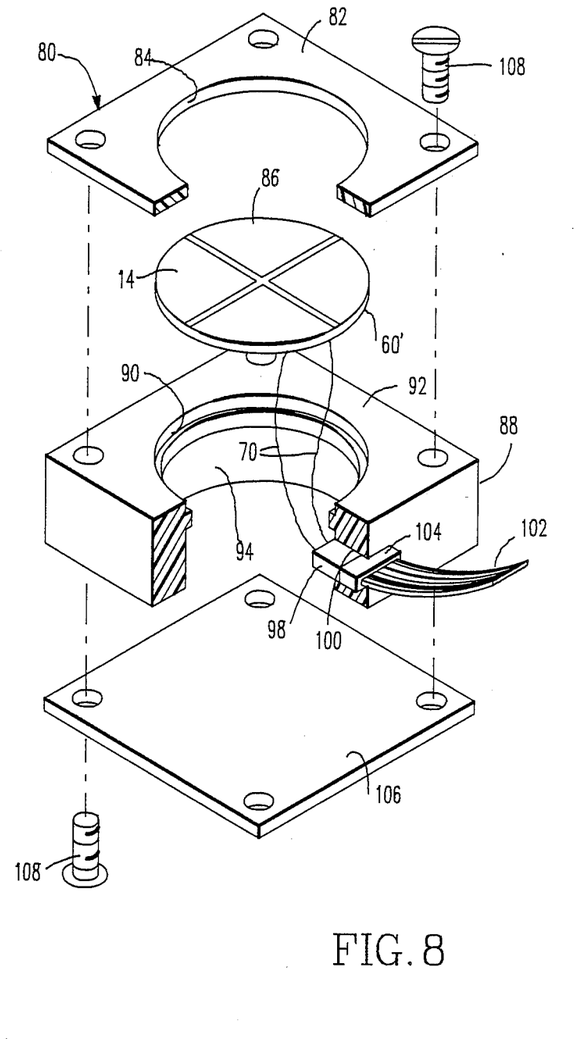
FIG. 8 is an exploded perspective view of a detector and housing therefor.

An exploded perspective drawing in FIG. 8 shows an exemplary plastic housing 80 for holding a disc detector 60'. The housing 80 includes a front retainer ring 82 having an aperture 84 designed to engage an upper outer edge 86 of detector 60'. A body portion 80 of the housing 82 has a stepped opening 90 or seat in the front surface 92 for receiving the detector 60' therein so that the front surface 14 of the detector 60' is flush with the front surface 92 of the body portion 88. An interior chamber 94 is formed in the body portion 88 to house output wires 70 and a connector or multi-wire plug 98. The plug 98 may be fitted into a side opening 100 in the body portion 88. Lead wires 102 in plug 104 mating with plug 98 connect the detector 60' to circuit means (not shown in FIG. 8). A back cover 106 closes the chamber 94. The retainer ring 84 and the back cover 106 are secured to the body portion 88 by screws 108 as shown.

There are a variety of ways to configure circuit means or electrical control circuitry useful with the various embodiments of the detector of the present invention. The particular circuit means that one uses depends on the type of detector used and the function it is to perform. These circuits are familiar to those skilled in the electronic design art. An exemplary circuit 110 useful with the arrangements described herein, and in particular with the ambient temperature compensated detector 60' shown in FIG. 7, is illustrated in schematic block form in FIG. 9. The circuit 110 includes four bridge circuits 112, each responsive to a corresponding sector S of the detector 60. Each bridge circuit 112 has two fixed reference impedances 114 and variable impedances 116 and 118.

Figure 9:
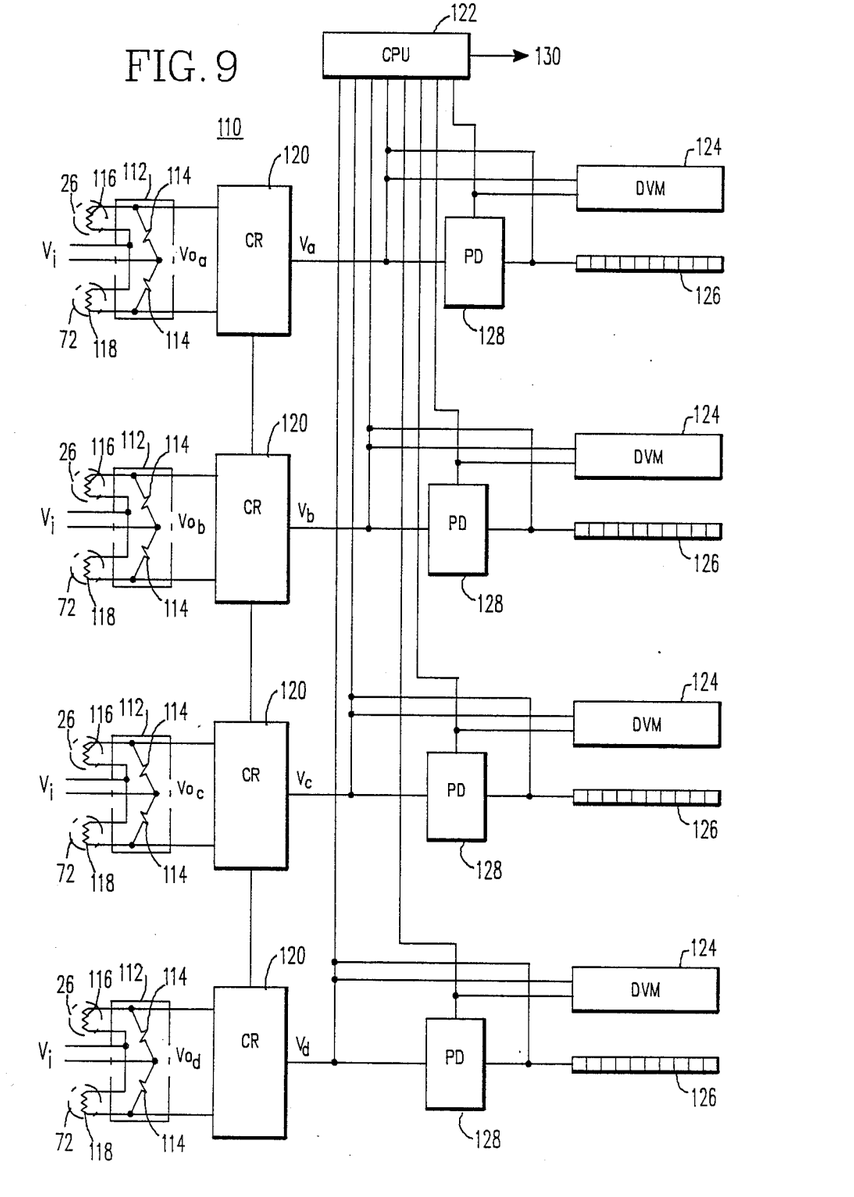
FIG. 9 is a schematic illustration of an exemplary electrical circuit for sensing the output of the detector of FIG. 7.

The variable impedance 116 represents the variable resistance of thermistor 26 (represented by dotted lines which encircle the resistance symbol). Each thermistor 26 separately senses the temperature change in the conductive layer 12 of each corresponding sector S. Variable impedance 118 represents the impedance of the compensating thermistor 72 (represented by dotted lines encircling the resistance symbol). Each thermistor 72 senses the ambient temperature of each respective corresponding sector S.

Each bridge 112 is supplied with an input voltage $V_i$ and each bridge 112 produces a corresponding output voltage $Vo_a$-$Vo_d$ in response to changes in the value of variable impedances 116 and 118. Under ambient conditions the resistance of the variable impedances 116 and 118 follow each other with changes in ambient temperature. When laser radiation impinges on one or more of the sectors S, the variable impedance 116 of a corresponding thermistor 26 changes at a different rate from the variable impedance 118 of the corresponding compensating thermistor 72 thereby unbalancing the corresponding bridge 112 and causing the corresponding output $Vo_a$-$Vo_d$ to change. However, because thermistors 26 and compensating thermistors 72 are both sensitive to ambient temperature, the unbalance in the bridge 112 introduced by the change in temperature of the corresponding sector S is insensitive to any fluctuation in ambient temperature. Thus, the extent or magnitude of the change of the output voltage $Vo_a$-$Vo_d$ is a measure only of the amount of laser radiation impinging on the particular sector S and hence is a measurement of the relative misalignment of the beam B. When the beam B is aligned, the relative change in the output signals $Vo_a$-$Vo_d$ is the same for each bridge 112.

The output of each bridge 112 is coupled to a conditioning circuit (CR) 120 which includes impedance matching circuitry and amplification circuitry (not shown but well known to those skilled in the art). The conditioning circuits 120 produce respective conditioned outputs $V_a$-$V_d$ which may be coupled to one or more of a variety of output devices including, for example, a computer control (CPU) 122, a digital volt meter (DVM) 124 and a light bar display 126. In addition, a peak detector (PD) 128 may be provided for each conditioning circuit 120 for detecting and holding the peak value of the respective conditioned outputs $V_a$-$V_d$, so that that the maximum change in the temperature of each sector S may be detected and observed. The output of the peak detector circuit 128 may be coupled in circuit with the computer control 122, the digital volt meter 124 and the light bar display 126 by means of a switch (not shown). An observer operating the system may thereby observe the peak temperature value of each sector S and thereby adjust the alignment of the laser beam accordingly. If automatic control is desired, an output 130 of the computer 122 may be used to drive an automated adjustment system (not shown).

The drift detector 40 shown in FIG. 3 may also be provided to supply the inputs $V_i$ in the illustration described with respect to FIG. 9 for monitoring the position of the beam B over time. Reset, re-zeroing and calibration circuitry may be provided in the circuit 110 illustrated in FIG. 9 by means known to those skilled in the art and which is not detailed herein.

The peak detector circuit 128 described above is particularly useful because in its various forms, the detector of the invention responds rapidly to the presence or absence of impinging laser radiation, and therefore, the signal output of each detector sector first rises to a maximum and then decays rapidly following the termination of the laser pulse. As the temperature of each sector returns to ambient, the corresponding peak detector circuit 128 holds the maximum value of the corresponding output $V_a$-$V_d$ for each sector. The operator may thereby observe the maximum change in temperature of each sector by observing the reading in digital volt meter 124 or light bar display 126 and adjust beam alignment. An instantaneous record of the output of each sector S may also be observed and recorded by means not shown, (e.g., a pen recorder), should that be desired.

Figure 10:
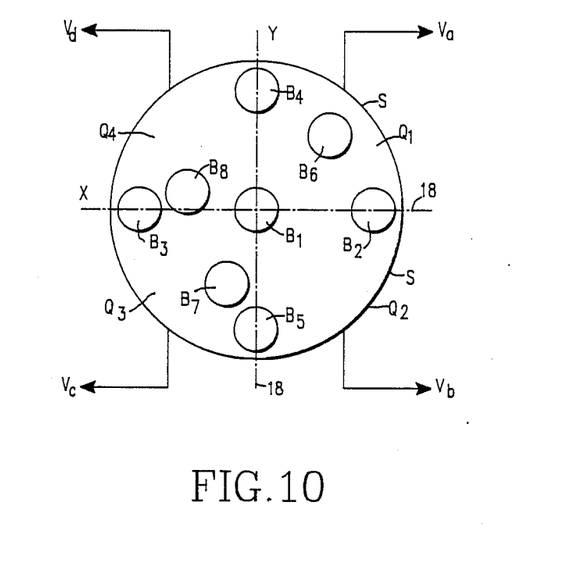
FIG. 10 is an exemplary illustration of a coordinate system for describing the location of a laser beam relative to the center of a detector.

There are a variety of mathematical solutions which are useful for correlating the output $V_a$-$V_d$ for each sector S in order to provide the operator with information necessary for repositioning the laser beam B with respect to the center of any one of the detectors of the present invention. FIG. 10 illustrates a Cartesian coordinate system in which the horizontal line representing the X axis corresponds to the horizontal slot, such as the slot 18 in FIG. 1, and the Y axis or vertical line represents the vertical slot 18 in FIG. 1, thereby dividing the detector 10 into four sectors S designated $Q_1$, $Q_2$, $Q_3$ and $Q_4$, respectively. It will be assumed that each sector S has a corresponding thermal sensitive device 26 in thermal contact therewith producing an output which is sensed by the circuitry shown in FIG. 9 and delivered as an output $V_a$-$V_d$ from each of the conditioning circuits 120. The sector S designated $Q_1$ is responsible for the output $V_a$. Likewise, the sector S designated $Q_2$ is responsible for the output $V_b$, the sector S designed $Q_3$ is responsible for the output $V_c$, and the sector S designed $Q_4$ is responsible for the output $V_d$. If the laser beam designated $B_1$ is located exactly centered at $C_d$, the outputs $V_a$-$V_d$ will be equal to each other. One can determine the X centroid of the beam by means of the expression:

$$X = \frac{V_a + V_b - V_c - V_e}{V_a + V_b + V_c + V_d} \quad (1)$$

In FIG. 10, the above expression reduces to X=0 for beam $B_1$.

The Y centroid may be determined by the expression:

$$Y = \frac{V_a + V_d - V_c - V_b}{V_a + V_b + V_c + V_d} \quad (2)$$

which reduces to Y=0 when the beam is located at the position designated $B_1$. If the beam is located at the position designated $B_2$ or entirely to the right of the Y axis, then X has a value greater than 0 and Y has a value 0. In such case the centroid of the beam $B_2$ using expressions (1) and (2) above reduces to X=1 and Y=0. For the position $B_3$, the centroid reduces to X=−1 and Y=0. If the beam is located at position $B_4$, X=0 and Y=1 and, for $B_5$, X=0 and Y=−1. Similarly, if the beam is located at $B_6$, the centroid reduces to X=1 and Y=1. For a beam located at position $B_7$, the centroid is located at X=−1, Y=−1. For other locations, the expressions (1) and (2) may be used to locate the beam. Such centroid information may be interpreted by the CPU 122 or by an operator in order to relocate the beam at the proper position with relative ease. Fractional values of the X and Y centroids may also be determined. For example, a beam at position $B_8$ may have an exemplary value X=−0.9, Y=+0.75. In any event, relatively simple algorithms may be employed by CPU 122 in software to provide centroid information and thus assist in repositioning of the beam B, or hardware circuits which perform addition and division may be employed to provide the necessary information in the form of analog voltages which may be interpreted for assisting in the repositioning of the beam. Such arrangements are known to those skilled in the art.

Commercially available printed circuit (PC) board material is ideally suited for use in fabricating the detector of the present invention in its various forms. Such material is available with various thicknesses of metal foil, typically copper, and various thicknesses of substrate material. An experimental detector approximately 1″ in diameter was fabricated using a PC board material having a 0.003 inch thick front and rear conductive copper layer bonded onto a 0.057 inch insulative substrate. A 0.010 inch copper foil overlayer was thereafter bonded or soldered to the front layer. The operation of the various devices set forth herein is not critically dependent upon the materials used for fabrication, nor is the operation of such devices critically dependent upon the specific dimensions of the various materials used. The scope of the disclosure covers a wide range of materials and dimensions.

In the above arrangements, holes 20 for the individual thermal sensitive devices 26 may be machined directly into printed circuit (PC) board material, which is mechanically stable and available in many forms. The accuracy with which the detectors can be fabricated is dependent mainly on the machining of the PC board material. The geometrical form and a number of sensing elements in the detector can be readily changed to meet the needs of various applications.

The circuit 110 shown in FIG. 9 may be housed separately from the detector and may be connected to the detector by a cable such as the flat-wire cable 102 illustrated in FIG. 8. However, because it is contemplated that various embodiments of the detector of the invention may be formed in part from PC board material hereinabove described, it is possible to mount all or part of the circuit 110 directly onto such PC board material integrally with the detector. In such an arrangement, circuit elements may be mounted on the backside 17 in a manner similar to the arrangement wherein compensating thermistor 72 is mounted or attached to the conductive layer 15 of detector 60′. Although not shown, it may also be possible to provide a PC board of sufficient area to accommodate an integral detector having a marginal border or frame area for supporting circuit elements. Such an arrangement can be readily appreciated by those skilled in the art, and is intended to be within the teachings of the present invention.

There has therefore been provided a detector suitable for use in the alignment of an optical system used with high power lasers. The detector is a thermal sensitive device that monitors the temperature rise in an array of elements caused by the energy absorbed when a laser beam is incident thereon. The detector system is relatively simple to construct using readily available components including standard PC board material and commerically available thermistors mounted in the PC board material. The detector may be fabricated in a wide variety of sizes and shapes to meet various needs including a disc shaped device for aligning a laser beam and a apertured detector for detecting laser beam drift.

While the invention has been described in connection with specific embodiments thereof, it will be understood that it is capable of further modifications. This application is intended to cover any variation, uses or adaptations of the invention following, in general, the principles of the invention, and including such departures from the present disclosure as come within known and customary practice within the art to which the invention pertains.

What is claimed is:

1. A detector responsive to laser energy impinging thereon for sensing the position of a laser beam to be aligned, the laser beam having an axis and being of a given cross-sectional area smaller than the detector, the laser beam being directed toward said detector which is centered relative to a desired path for the laser beam comprising:

a substrate;

a plurality of thermally conductive sectors carried by the substrate, each of said sectors being thermally isolated from each other and symmetrically located relative to a center of the detector for intercepting a portion of the beam cross-section and for absorbing a portion of the laser energy impinging thereon in proportion to the portion of the beam cross-section intersected by each sector, each sector converting a portion of said absorbed laser energy to heat,; and a corresponding thermal sensitive means for each sector in thermal contact therewith for sensing the heat of the absorbed laser energy impinging on each corresponding sector, each of said thermal sensitive means being thermally isolated from the other sectors and responsive to the heat absorbed by its corresponding sector for producing a response corresponding to the amount of the laser energy impinging on its said corresponding sector in proportion to the beam cross-section intersected by said sector, relative differences in the response of each thermal sensitive means providing an indication of the relative misalignment of the laser beam axis with respect to the desired path.

2. A detector centered in a desired laser beam path for intersecting a laser beam of a given cross-sectional area to be aligned with the desired laser beam path, the detector being responsive to laser energy impinging thereon comprising:
- a disc having planar front and rear faces, the disc formed of a thermally insulative substrate, and a thermally conductive metallic layer overlying the substrate on the front face, said thermally conductive layer for absorbing laser energy intersected thereby and impinging thereon and converting a portion of said energy to heat, said thermally conductive layer being divided by at least one slot into sectors of equal area, said at least one slot being of a depth sufficient to divide the thermally conductive layer so that each sector formed in the thermally conductive layer is thermally isolated from other sectors and each sector absorbs laser energy in proportion to the area of the laser beam intersected thereby; and
- a plurality of thermal sensitive means responsive to heat for producing an indication of temperature, at least a corresponding one of said thermal sensitive means for each sector being thermally coupled to the divided thermally conductive layer of the corresponding sector for sensing the temperature of each corresponding sector, the thermally conductive layer of each sector being heated by laser energy impinging thereon in proportion to the area of the laser beam intersected by each sector, each thermal sensitive means being responsive to the heat for producing the indication of the temperature of the corresponding sector, relative differences in the indications of the temperature of the corresponding sectors being indicative of the relative misalignment of the beam.

3. The detector of claim 2 wherein the thermally conductive layer forming the front face of the detector is formed of two layers of metal foil for improving heat transfer within said thermally conductive layer.

4. The detector of claim 2 further including:
- a rear thermally conductive layer overlying the rear face of the substrate and bonded thereto; and
- ambient temperature compensating thermal sensitive means in thermal contact with the rear thermally conductive layer for providing an indication of the ambient temperature of the detector.

5. The detector of claim 4 further including circuit means responsive to the ambient temperature compensating thermal sensitive means for providing a response representative of changes in the ambient temperature of each sector.

6. The detector of claim 5 wherein the circuit means responsive to the thermal sensitive means and the ambient temperature compensating thermal sensitive means includes means for combining the respective responses to thereby compensate for changes in ambient temperature.

7. The detector of claim 2 further including circuit means responsive to the thermal sensitive means for providing a response representative of changes in the temperature of each sector in response to the amount of laser energy impinging thereon.

8. The detector of claim 2 wherein said disc is formed of a composite laminate printed circuit material including an insulating substrate and overlying front and rear copper foil metallic layers adhered thereto.

9. The detector of claim 2 wherein the disc is in the form of an annular ring having a centrally located aperture therein for allowing the laser beam to pass therethrough unobstructed, and which detector becomes selectively heated when the laser beam drifts from the confines of the aperture and impinges on one or more sectors of the detector.

10. The detector of claim 2 wherein the rear face of the detector is divided into several electrically conductive areas and the thermal sensitive means include relatively lightweight conductor leads attached one each to selected conductive areas to thereby act as strain relief contacts for the thermal sensitive means.

11. The detector of claim 2 wherein the front surface includes a plurality of relatively narrow V shaped grooves formed in the front surface.

12. The detector of claim 11 wherein said grooves have side walls disposed at an angle of about 30° relative to each other for causing multiple reflections of the laser radiation.

13. The detector of claim 12 wherein the grooves are disposed in a spiral configuration.

14. The detector of claim 2 wherein the disc is circular and the slots are diametric for dividing the front surface into at least four sections of equal area.

15. The detector of claim 14 wherein the disc is circular and the rear face is divided by diametric slots and a concentric slot located about midway between the center of the disc and an outer margin thereof.

16. The detector of claim 2 further including a housing having an open front for receiving the detector therein, and connection means for coupling the detector to exterior circuitry.

17. The detector of claim 2 further including bridge circuit means sensitive to the thermal detectors for providing outputs indicative of the amount of laser energy impinging on each sector.

18. The detector of claim 2 further including circuit means for detecting the peak value of the temperature of each sector.

19. The detector of claim 2 wherein at least one each of the thermal sensitive means is located at the center of each sector.

20. The detector of claim 2 wherein the temperature response of each thermal sensitive means is relatively rapid and insensitive to independent distribution of laser energy.

21. The detector of claim 2 wherein the substrate has at least one aperture formed therein for each sector extending from a rear face thereof towards the thermally conductive layer and one of said thermal sensitive means is located in each of said aperture.

22. The detector of claim 2 wherein the at least one slot in the front face extends across the center of the disc and intersects another such slot.

23. The detector of claim 2 further including means for visually displaying the relative amount of laser energy impinging on each sector.

24. The detector of claim 23 wherein the means for visually displaying the amount of laser energy impinging on each sector includes a light bar display responsive to the thermal sensitive means for each sector.

25. The detector of claim 2 further including microprocessor means responsive to the thermal sensitive means for each sector for providing control outputs adapted to automatically align the laser beam with the detector.

26. The detector of claim 2 wherein the laser beam is pulsed in order to prevent excessive heating of the thermal sensitive means.

27. A detector system for thermally sensing the position of a laser beam of a given cross-sectional area relative to a desired beam path for the beam comprising:
   disc means for location centrally of the desired beam path for intersecting the beam, said disc means being divided into thermally conductive sectors, said sectors being thermally isolated from each other and symmetrically located relative to a center of the disc means, each sector for absorbing laser energy impinging thereon and in proportion to a portion of the cross-sectional area of the beam impinging thereon, each isolated sector for converting a corresponding portion of the laser energy impinging thereon into heat;
   a thermal sensitive means for each sector in thermal contact therewith for sensing the heat of the absorbed laser energy impinging on each corresponding sector, each of said thermal sensitive means being electrically responsive to produce an electrical output when energized, said output indicative of the proportional amount of the laser energy falling on its corresponding sector; and
   circuit means for energizing the thermal sensitive means and being responsive to the electrical output of each thermal sensitive means for producing an indication of the relative misalignment of the laser beam with respect to the beam path said indication of misalignment being proportional to differences in the electrical outputs.

28. The detector system of claim 27 further comprising ambient temperature responsive thermal sensitive means in thermal contact with the disc means for sensing the ambient temperature thereof and producing a response indicative of said ambient temperature.

29. The detector system of claim 28 wherein said circuit means comprises bridge means responsive to the thermal sensitive means the the ambient temperature responsive thermal sensitive means for producing electrical outputs indicative of the relative misalignment of the laser beam with respect to the beam path and indicator means responsive to the electrical outputs for producing observable indication of said relative misalignment of the laser beam.

30. The detector system of claim 29 wherein the indicator means includes at least one of a volt meter responsive to the electrical outputs, a light bar indicator for producing a visual indication of the electrical outputs and a peak heat detector and hold means responsive to the electrical outputs and coupled in circuit with the volt meter and visual indicator means for providing a modified electrical output indicative of a maximum value of said electrical outputs.

31. A method of detecting the position of a laser beam of a given cross-sectional area relative to a desired beam path comprising the steps of:
   providing a thermally conductive target selectively located in the center of the desired beam path for intercepting and absorbing laser energy and converting the absorbed laser energy to heat;
   directing the laser beam at the target for absorption and conversion to heat;
   dividing the target into at least two thermally isolated sectors so that the energy absorbed and converted to heat by each sector corresponds proportionally to that portion of the cross-sectional area of the beam impinging on the sector;
   detecting the temperature of each sector, the temperature of each sector providing an indication of the amount of energy impinging on each sector; and
   comparing the relative differences in the temperature of each corresponding sector, which provide an indication of the relative misalignment of the beam.

32. A method of claim 31 further comprising pulsing of the laser beam while directing it at the target.

33. The method of claim 31 further comprising sensing the ambient temperature of the target for compensating the temperature of the sectors heated by the laser beam in response to changes in the ambient temperature by the target.

* * * * *